United States Patent [19]
Klank et al.

[11] Patent Number: 5,970,397
[45] Date of Patent: Oct. 19, 1999

[54] METHOD FOR THE FREQUENCY CORRECTION OF MULTICARRIER SIGNALS AND RELATED APPARATUS

[75] Inventors: Otto Klank, Lehrte; Dominique Madeleine, Hannover, both of Germany

[73] Assignee: Deutsche Thomson-Brandt GmbH, Villingen-Schwenningen, Germany

[21] Appl. No.: 08/885,223

[22] Filed: Jun. 30, 1997

[30] Foreign Application Priority Data

Jul. 5, 1996 [EP] European Pat. Off. .............. 96110862

[51] Int. Cl.$^6$ ...................................................... H04B 1/00
[52] U.S. Cl. ........................................... 455/139; 455/257
[58] Field of Search ..................................... 455/257, 139, 455/255, 256, 258, 259, 260, 265; 370/342

[56] References Cited

U.S. PATENT DOCUMENTS

| | | | |
|---|---|---|---|
| 5,159,292 | 10/1992 | Canfield et al. | 331/1 A |
| 5,602,835 | 2/1997 | Seki et al. | 375/206 |

FOREIGN PATENT DOCUMENTS

| | | | |
|---|---|---|---|
| 441730A1 | 8/1991 | European Pat. Off. . | |
| 656706A2 | 6/1995 | European Pat. Off. . | |
| 656706A3 | 6/1995 | European Pat. Off. . | |
| 0 817 418 | 6/1997 | European Pat. Off. | H04L 5/06 |
| H7-095174 | 4/1995 | Japan | H04J 11/00 |
| H7-095174 | 6/1995 | Japan | H04J 11/00 |
| 9602990 | 2/1996 | WIPO | H04L 5/06 |

OTHER PUBLICATIONS

Copy of the European Search Report 3 pages.
Nilsson et al., "An Analysis of Two-dimensional Pilot Symbol Assisted Modulation for OFDM" IEEE International Conference on Personal Wireless Communications, Apr. 1997.
Robertson et al., "Analysis of Effects of Phase Noise in OFDM Systems" IEEE Conference on Communications, Feb. 1995.
Tufvesson et al., "Pilot Assisted Channel Estimation for OFM in Mobile Cellular Systems" IEEE 47th Vehicular Technology Conference, Mar. 1997.

*Primary Examiner*—Reinhard J. Eisenzopf
*Assistant Examiner*—Makoto Aoki
*Attorney, Agent, or Firm*—Joseph S. Tripoli; Eric P. Herrmann; Ronald H. Kurdyla

[57] ABSTRACT

Various methods for terrestrial transmission of digital broadcast signals as DVB, HDTV-T and DAB signals are known. One of these methods is the OFDM method, where the transmitted signal includes a multiplicity of modulated carriers. These carriers are separated in the receiver by means of a Fast Fourier Transformation (FFT). Before being transposed in the frequency domain by the FFT, the analog signal must be sampled. For this purpose a local oscillator controls the timing in front of the FFT. Oscillator imperfections like jitter and frequency offsets can degrade the accuracy of the sampling operation and therefore introduce intercarrier interferences after the FFT. A feedback loop combining the AFC and CPEE process has been designed in order to correct frequency deviations and to reduce jitter of the signal without introducing significant phase noise.

6 Claims, 6 Drawing Sheets

METHOD FOR THE FREQUENCY CORRECTION OF MULTICARRIER SIGNALS AND RELATED APPARATUS

The present invention relates to the frequency correction of multicarrier signals and to a corresponding apparatus, especially for controlling the local timing oscillator in a OFDM receiver.

BACKGROUND OF THE INVENTION

Various methods for terrestrial transmission of digital broadcast signals are known, having modulation types like OFDM, QPSK and QAM. Examples for such broadcast signals are DVB (digital video broadcast), HDTV-T (hierarchical digital television transmission) and DAB (digital audio broadcast) signals.

At the OFDM method (Orthogonaly Frequency Division Multiplexing) the transmitted signal includes a multiplicity of modulated carriers. These carriers are separated in the receiver by means of a Fast Fourier Transformation (FFT). Before being transposed in the frequency domain, the analog signal must be sampled. For this purpose a local oscillator controls the timing in front of the FFT. Oscillator imperfections (jitter, frequency offset) can degrade the accuracy of the sampling operation and therefore introduce intercarrier interferences after the FFT. The Automatic Frequency Control processing (AFC) and the Common Phase Error Estimation processing (CPEE) are suited to give estimates of the frequency errors in order to correct the oscillator imperfections.

SUMMARY OF THE INVENTION

It is one object of the invention to disclose a method which allows to reduce frequency deviations and jitter of multicarrier signals.

It is a further object of the invention to disclose an apparatus which utilises the inventive method.

The AFC process has the advantage that it can detect large frequency deviations up to 20 times the carrier spacing. But it can be performed only once per block, which is delimited by two consecutive reference symbols. Its result is available after a large processing delay of approximatively 18 symbols. Therefore, it cannot be used to correct the jitter of the oscillator. Furthermore, it leaves offsets which can degrade considerably the performances for the sensitive layers.

The CPEE process on the other hand provides a good accuracy because a filtering of the noise over a large number of pilot cells is performed. It can be performed for each symbol and therefore allows to detect oscillator jitter. The result is available after a delay of 4 symbols. But, because the CPEE is based on phase comparisons, it cannot handle large frequency deviations. A rotation of $\pm\pi$ between two symbols is the maximum theoritical value.

Therefore, according to the invention both methods are combined in a feedback loop, in which the AFC is used to correct the frequency offset at initialisation and the CPEE to correct the remaining deviation and the jitter after the initialization. This allows to remove a large part of the frequency deviations and of the low-frequency components of the local oscillator jitter without introducing any significant phase noise.

In principle, the inventive method for the frequency correction of multicarrier signals consists of a feedback control loop in which a first and a second process for estimation and/or correction of the carrier frequency deviation is performed, wherein the first process treats frequency deviations in the order of several carrier spacings and the second process treats frequency deviations in the order of a fraction of the carrier spacing.

Advantageously between the first and second process is switched over in dependance of a threshold value.

Advantageously the first and second process of the frequency deviation estimation are performed after separation of the various carriers of the multicarrier signal and the results are used to correct the baseband signal in front of the carrier separation.

Furthermore the multicarrier signal can be an OFDM signal comprising CAZAC-Sequences, M-Sequences and pilot cells, and in the first process CAZAC-Sequences and M-Sequences are investigated, which are distributed in the reference symbols of the OFDM signal, and in the second process the frequency deviation is estimated by averaging the phase variation over the pilot cells.

It is of advantage that the feedback control loop performs the following steps:

when the first process is switched on, the second process is switched off during a whole block;

during the following block it is switched between the first process and the second process;

at the end of that block the second process is reinitialized;

after reinitialization the second process is switched on and the first process is switched off.

In principle the inventive apparatus for the frequency correction of multicarrier signals, consists of that in a feedback control loop a first and a second unit for estimation and/or correction of the carrier frequency deviation are comprised, wherein the first unit treats frequency deviations in the order of several carrier spacings and the second unit treats frequency deviations in the order of a fraction of the carrier spacing.

Advantageously the feedback control loop further comprises a multiplier for modulation of the multicarrier signal, a Fast Fourier Transformation unit for separation of the various carriers of the multicarrier signal, whereby the signal of separated carriers is supplied to the first and second unit for estimation and/or correction of the carrier frequency deviation, the outputs of said first and second unit are fed to a local oscillator and the output signal of the local oscillator is fed to the multiplier.

BRIEF DESCRIPTION OF THE DRAWINGS

Preferred embodiments of the invention are described with reference to the accompanying drawings, which show in.

DETAILED DESCRIPTION OF THE PREFERRED EMBODIMENTS

Figure 1A:
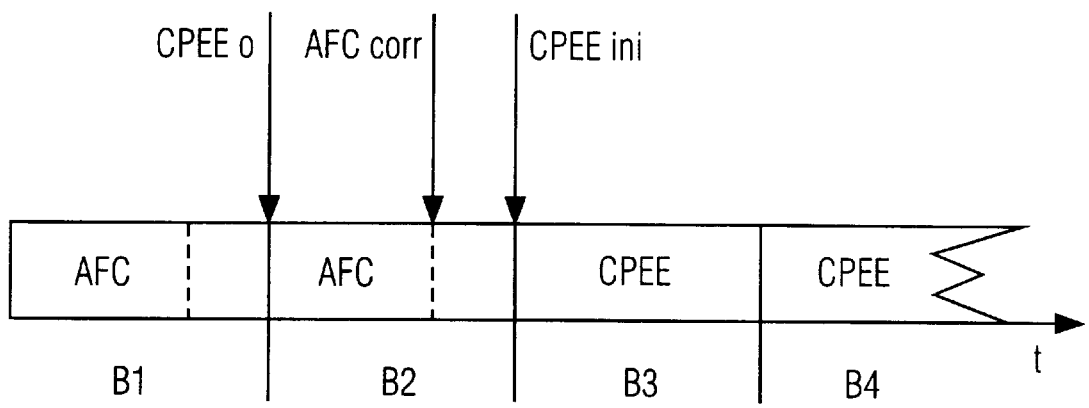
FIG. 1 a time (a) and transition diagram (b) of the inventive process.
Figure 1B:
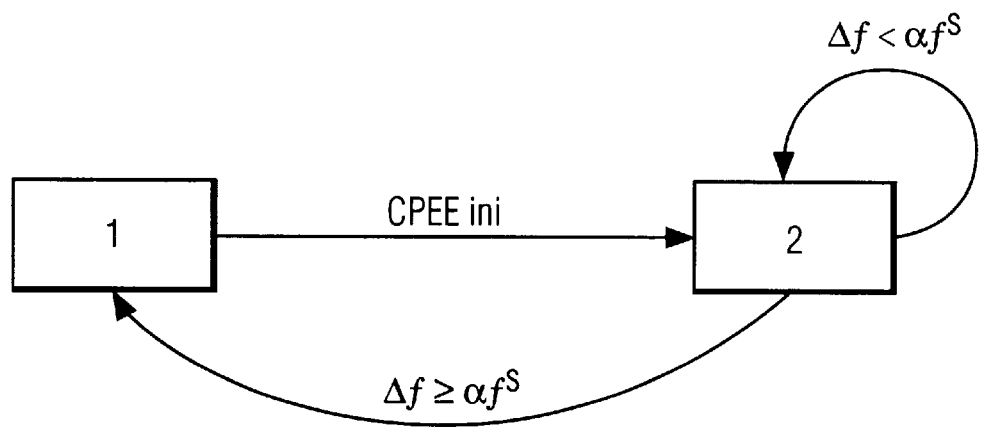

A time and transition diagram of the processing is shown in FIG. 1a and 1b, respectively. In FIG. 1a each block B1, B2, B3, . . . consists of 25 symbols. The AFC result is available only after a large delay of about 18 symbols and there is no way to predict it. Therefore, it has to be waited for the following block B2 before switching on the AFC and to switch off the CPEE during that block (marked in the figure by CPEEo). This yields a one block delay for switching on the AFC. At the end of that block, it is better to reinitialize the CPEE (marked in the figure by CPEEini) to rely upon relevant values from the beginning and avoid convergence time. For the following blocks B3, B4 the CPEE correction is performed.

The transitions between APC and CPEE are shown in FIG. 1b. Initially the processing is in state 1, perfoming the AFC. After initialization the CPEE must be switched on, the AFC must be switched off, symbolized by state 2. The AFC result is then compared to a threshold value $\alpha f_s$. Whether it is smaller or larger than the validity limit of the CPEE, the processing remains either in state 2 or turns back to state 1, performing the AFC processing for the next block.

Figure 2:
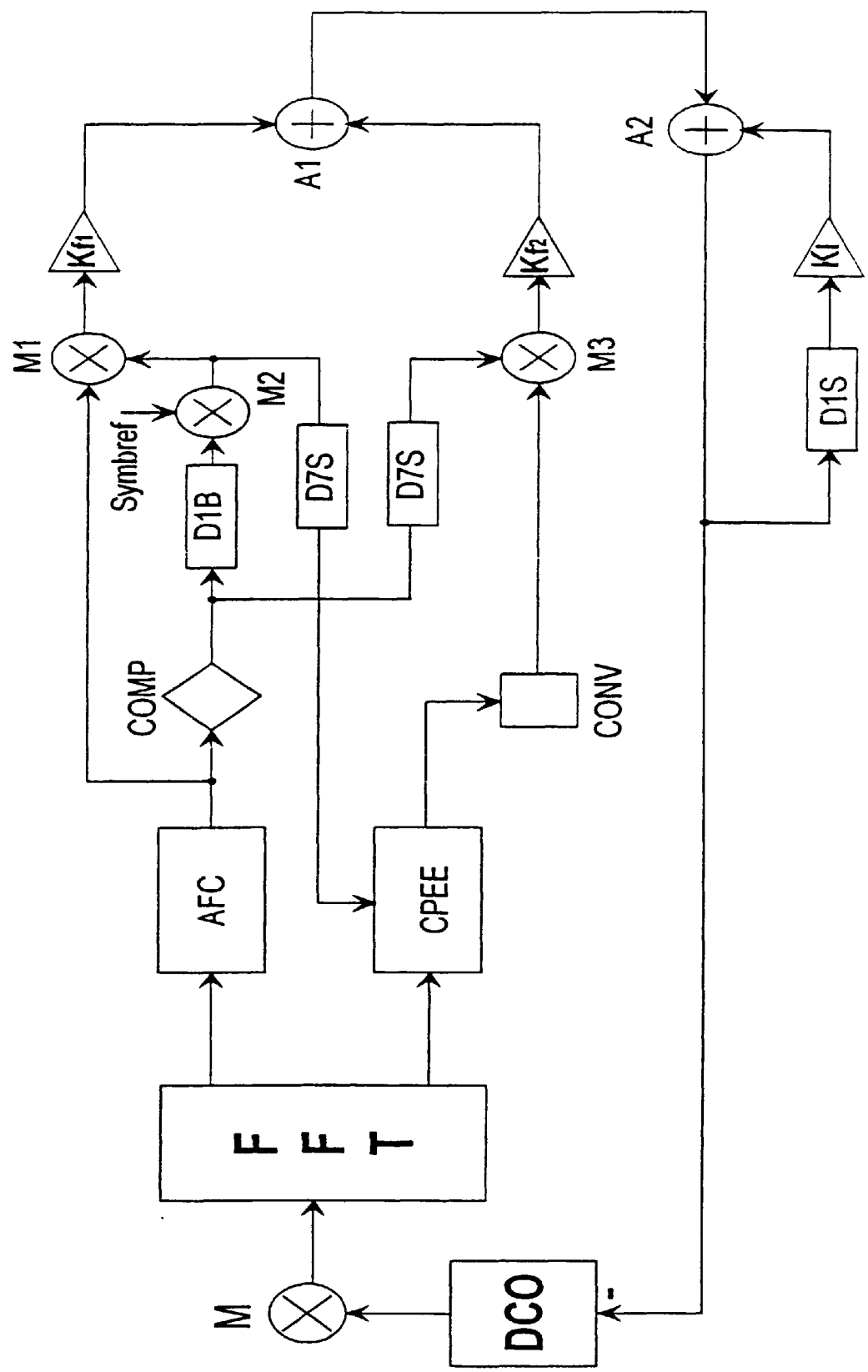
FIG. 2 a block-diagram of the inventive feedback loop.

A principle block-diagram of the feedback loop structure according to the invention is shown in FIG. 2. Digital data are fed to a Fast Fourier Transformation FFT, which separates the different carriers. The output of the FFT is fed to the AFC and CPEE processing units. For the AFC processing the so-called CAZAC-Sequences and M-Sequences, distributed in the reference symbols of the OFDM signal, are investigated. At the CPEE processing the frequency deviation is estimated by averaging the phase variation over the pilot cells. The AFC result is compared to a threshold value $\alpha f_s$ in unit COMP, yielding the values 0 or 1. The resulting value is delayed by one block in D1B and multiplied in M2 either with Symbref=1, if there is a reference symbol or with Symbref=0, if there is no reference symbol. The multiplication result of M2 is used for two purposes. First it is fed to a further multiplication unit M1, where it is multiplied with the original AFC result. The result of M1 then is scaled in unit Kf1 and fed to the Adder A1. Secondly the multiplication result is delayed by seven symbols in D7S and is fed to the CPEE unit for initialization. The result of the CPEE, which is a phase-error estimation, is then converted into an equivalent frequency deviation in the converter CONV. The converted result is fed to the multiplier M3, where it is multiplied with the result of the comparator COMP, delayed by seven symbols in D7S. The result of M3 is scaled in Kf2 and also fed to the adder A1. The multipliers M1 and M3 together with the adder A represent a switching function, passing either the result of the AFC process or that of the CPEE process, depending on the result of the comparison in COMP. The result of A1 is filtered at the end of the loop in an IIR filter, which is built up by a delay D1S, amplifier KI and adder A2 to maintain the preceeding correcting value. The corrected signal is fed to a digital controlled oscillator DCO in front of the FFT, which is used for modulation of the new incoming sampled data by the modulator M.

Figure 3:
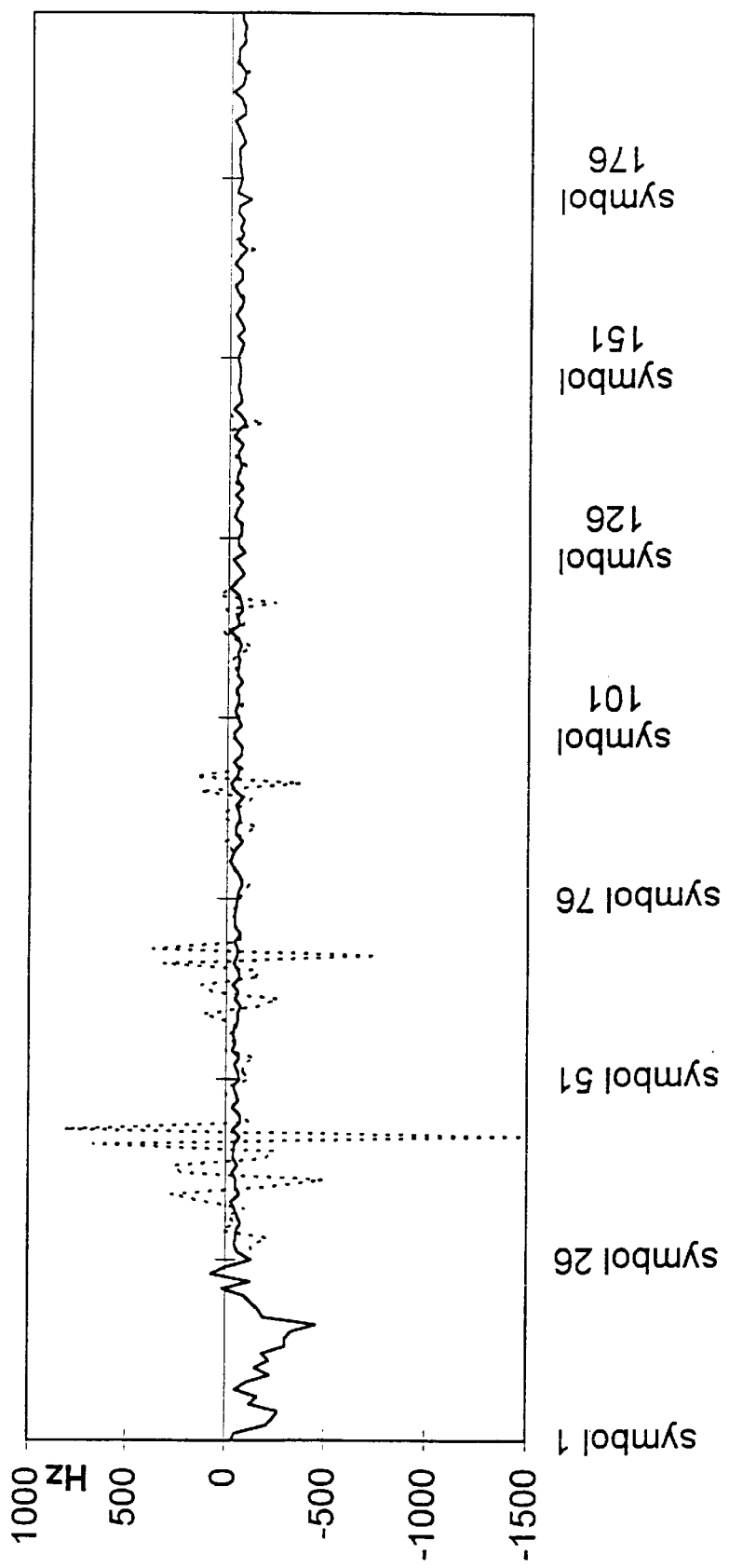
FIG. 3 the convergence of the CPEE with and without reinitialization.

FIG. 3 shows the convergence of the CPEE with and without reinitialization for parameters as used for the following simulations. The reinitialization occurs at the 26th symbol S26. As can be seen, the algorithm needs a few blocks of about 4 and 5 blocks to converge if it is not reinitialized (broken line). This roughly corresponds to a duration between 30 and 40 ms. This time delay is not needed, if reinitialization is used (full line).

Particularly suited values of the parameters will be defined in the following and have been determined by means of simulations.

In the simulations, the AFC can always correct the rough deviation in one step and do not need to be switched on several times consecutively. However, there may be conditions where one AFC correction step is not sufficient. In that case, a second structure can be defined to enable the AFC to stay in the state ON.

The theoretical limit of the CPEE corresponds to a rotation of the carriers of $\pi$ during the symbol length. In the case of a 2K OFDM, with a ¼ guard interval, it corresponds to a limit of 1562.5 Hz. Because of the presence of noise, the domain of validity in real conditions is smaller than that limit value. Simulations have been performed to evaluate it.

Parameters of the simulations:

2K OFDM, guard interval ¼;

Rice channel (k=10, SNR=23,5 dB) and Rayleigh channel (SNR=8,5 dB);

common phase noise;

constant frequency deviation.

Figure 4:
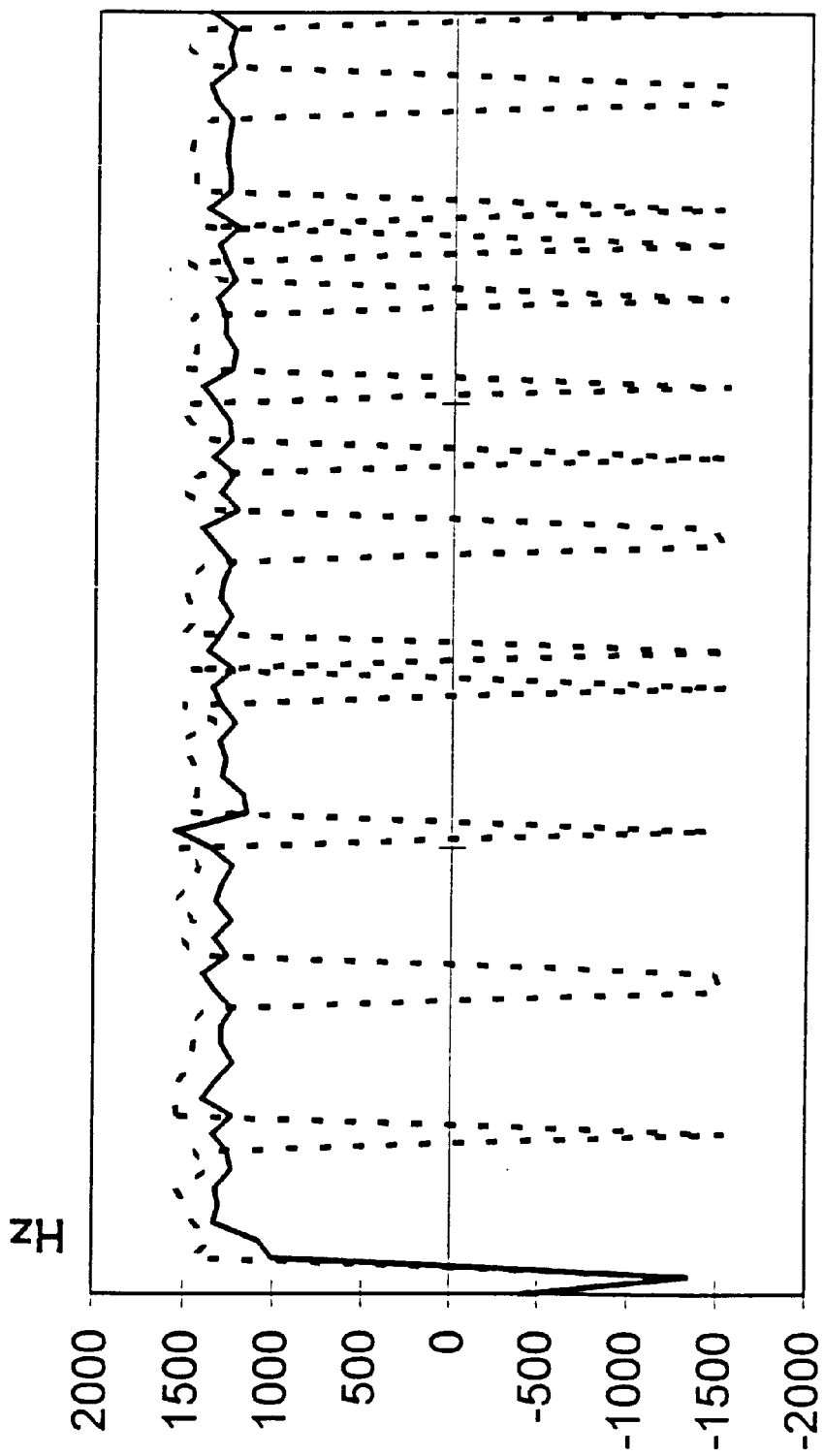
FIG. 4 results of the CPEE with different frequency deviations.

The results in both channels are shown in FIG. 4. With a frequency deviation of 1300 Hz (full line), the common phase estimates are always relevant and could be fed back to the DCO. The small variations of the estimates are due to the phase noise and to the additive gaussian noise. With 1500 Hz (broken line) due to the near theoretical limit the algorithm cannot distinguish between a positive and a negative frequency deviation. According to that results, a value of $\alpha=0.2$, which corresponding to about 800 Hz, is a reasonable threshold.

The AFC presents the advantage of having finished its correction before the next reference symbol goes through the FFT. That means the deviation can be corrected in one step without any risk of instability. A coefficient $Kf_1=1$ can be used and ensure the rapidity of the correction.

As the correction occurs with a delay of 4 symbols, the choice of a too large coefficient $Kf_2$ can cause instability of the system. This is shown with the following theoritical calculations:

At time k, let x(k) be the frequency deviation of the DCO,
C(k) be the correction,
y(k) be the corrected frequency,
ŷ(k) the estimation of y(k) (from the CPEE).
ŷ(k−4) is fed back to the DCO and the following equations can be writen:

$C(k)=K_I{}^*C(k-1)-Kf_2{}^*\bar{y}(k-4)$ $y(k)=x(k)+C(k)$ which yields:

$y(k)-x(k)=K_I{}^*y(k-1)-K_I{}^*x(k-1)-Kf_2{}^*\bar{y}(k-4)$

If a perfect estimation of the CPEE is assumed, the following equation of a 4th order IIR filter is obtained:

$y(k)-x(k)=K_I{}^*y(k-1)-K_1{}^*x(k-1)-Kf_2{}^*y(k-4)$

The Laplace transform of the IIR filter is the following:

$$H(z) = \frac{1-K_1 \times z^{-1}}{1-K_1 \times z^{-1} + Kf_2 \times z^{-4}}$$

The system is stable if the amplitude of each zero is smaller than 1. When Kl is close to 1, it corresponds to a limit value of $Kf_2 \approx 0.44$. The chosen value $Kf_2$ should be smaller than that limit value to provide a decay factor.

The feedback loop relies upon an estimation of the frequency deviation that is based on noise-affected signals and introduces therefore additive phase noise. Low values of $Kf_2$ can reduce the power of that phase noise but will limit the correction to the very low frequencies of the frequency jitter. A compromise between those two phenomena must be found.

This compromise can be found by simulations of the response of the system with different values of $Kf_2$ and different jitters. the jitters that are been used are composed of two frequencies $fm_1$ and $fm_2$. The frequency deviation $\Delta f(t)$ can be written as follows:

$$\Delta f(t)h_1 \times \cos(2fm_1 t) + h_2 \times \cos(2\pi fm_2 t)$$

with the following sets of values (in Hz):
 $fm_1=1$, $h_1=48$, $fm_2=4$, $h_2=16$
 $fm_1=10$, $h_1=48$, $fm_2=40$, $h_2=16$
 $fm_1=20$, $h_1=48$, $fm_2=80$, $h_2=16$
parameters of the simulations:
 2K OFDM, guard interval ¼;
 Rice channel (k=10, SNR=23, 5dB) and Rayleigh channel (SNR=8, 5dB).

Figure 5:
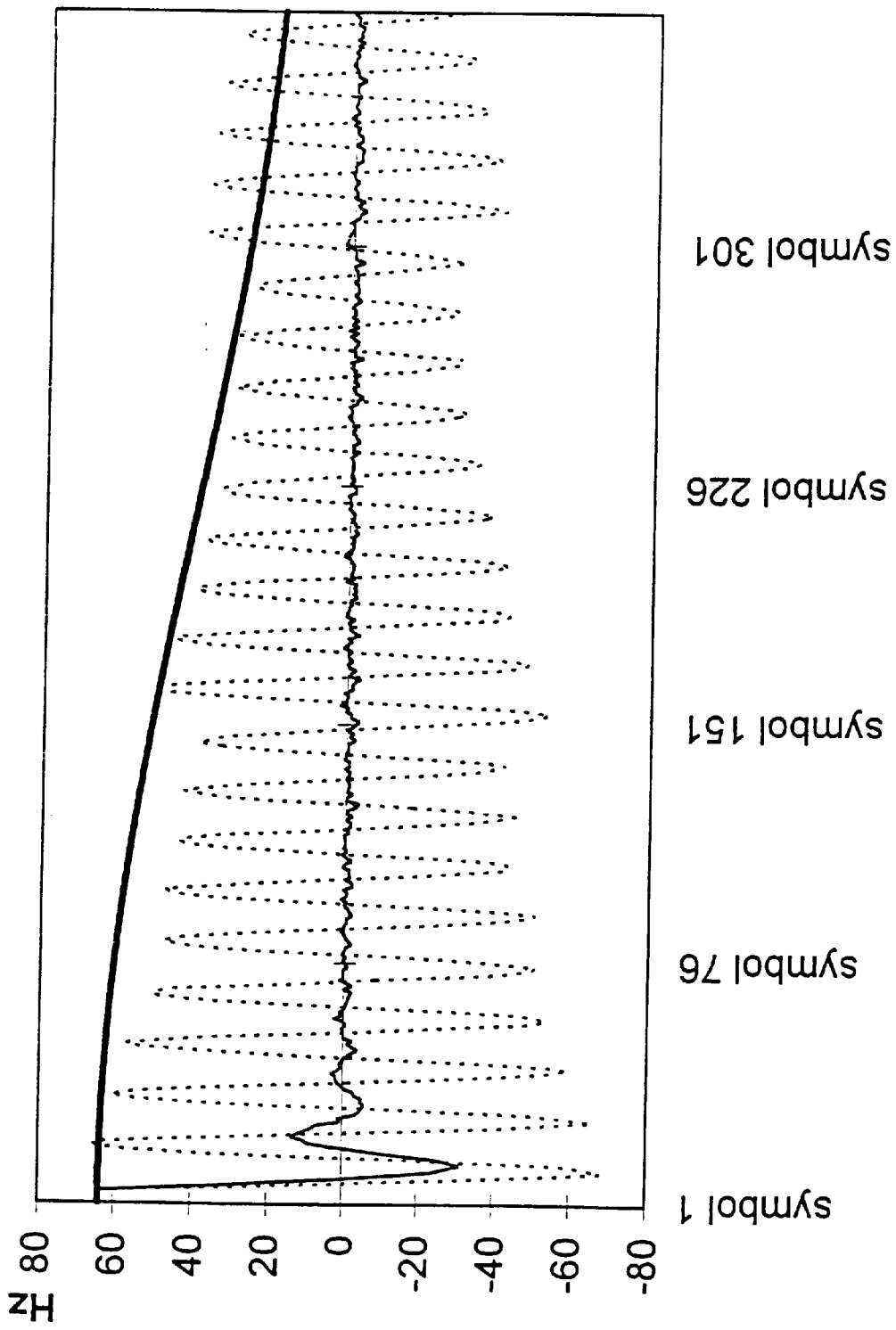
FIG. 5 the frequency jitter reduction for different values of $Kf_2$.

Typical results are shown in FIG. 5 in comparison with the non-corrected behaviour (thick full line). According to the previous, a too large value of Kf2 produces instability and does not ensure the convergence of the system. The simulation gives a limit value around 0.4 (broken line). For smaller values such as 0.25 (thin full line), there is no problem of stability. The phase noise introduced by the loop does not bring much degradation of the results, even for large values of Kf2. For example, for Kf2=0.3, the corresponding degradations are in both cases less than 0,05 dB. Simulations have also shown that frequencies up to 30 Hz are removed. Therefore, a suited value is Kf2=0,3, which corresponds to one of the largest possible values without any risk of instability.

A value very close to one had to be chosen for the Coefficient K1. The simulations have been performed with 0.99995 which gives good results.

Figure 6:
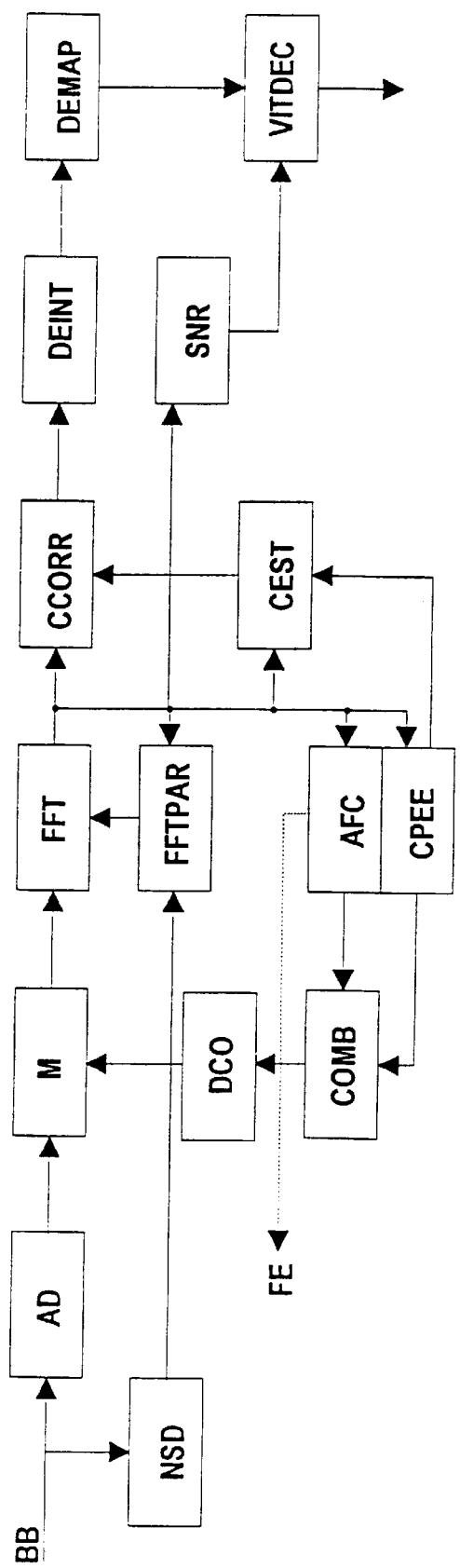
FIG. 6 a block diagram of a receiver according to the invention.

The blockdiagram of a possible OFDM receiver according to the invention is shown in FIG. 6. The front-end FE and source decoding parts are left out in order to enhance clarity. After a lowpass filtering the baseband signal BB is converted by means of a Analog-to-Digital converter AD and after modulation by the complex multiplier M fed to the FFT unit. To avoid inter-carrier-interferences of the OFDM carriers caused by an incorrect sampling phase, the feedback loop built up by the AFC and CPEE units and the digital controlled oscillator DCO corrects the frequency position of the baseband signal (or generally of the down-converted signal) to a value corresponding with the sampling rate. The FFT process itself is started by a special impulse which is derived by the unit NSD from the null symbol of the OFDM transmission frame. Fine positioning of the FFT is performed by the evaluation of special synchronization symbols. The setting of the FFT window, control of its position and time base are performed by the unit FFTPAR. For channel estimation a known set of reference symbols is compared with the received reference symbols in unit CEST. The estimated values are used to feed the channel correction unit CCORR in the signal processing path, which typically consists of four multipliers in the signal path for correcting amplitude and phase of each carrier. The result is finally successive fed to a deinterleaving unit DEINT, a soft symbol demapper DEMAP and a Viterbi decoder VITDEC, to which also the result of a SNR estimation determined in SNR is supplied.

The invention can be used for transmission, in particular terrestrial transmission, of e.g. digital TV, digital audio or other digital data signals.

We claim:

1. In apparatus for processing multicarrier signals, a method of frequency correction comprising:

performing a first estimation and/or correction process of the carrier frequency deviation in the order of several carrier spacings in a first (AFC) feedback processing loop;

performing a second estimation and/or correction process of the carrier frequency deviation in the order of a fraction of carrier spacings in a second (CPEE) feedback processing loop;

switching between the first (AFC) and second (CPEE) process depending upon frequency errors being greater or lesser than a frequency threshold value ($\alpha f_s$).

2. Method according to claim 2, characterized in that the first (AFC) and second (CPEE) process are performed after separation of the various carriers of the multicarrier signal and the results are used to correct the baseband signal in front of the carrier separation.

3. In apparatus for processing multicarrier signals, a method of carrier frequency correction comprising:

performing a first estimation and/or correction process of carrier frequency deviation in the order of several carrier spacings in a first (AFC) feedback processing loop;

performing a second estimation and/or correction process of carrier frequency deviation in the order of a fraction of carrier spacings in a second (CPEE) feedback processing loop;

inactivating the second process (CPEE) during a whole block (B1) when the first process (AFC) is activated;

during the following block (B2) inactivating the first process (AFC) and activating the second process (CPEE);

reinitializing the second process (CPEE) at the end of that block (B2);

after reinitialization, performing the second process (CPEE) to the exclusion of the first process (AFC).

4. In a system for processing a multicarrier signal including an OFDM signal comprising CAZAC-Sequences, M-Sequences and pilot symbols, a method for the frequency correction of such multicarrier signal comprising:

performing estimation and/or correction of the carrier frequency deviation in the order of several carrier spacings in a first (AFC) feedback processing loop, by examining CAZAC-Sequences and M-Sequences distributed in reference symbols of the OFDM signal; and performing estimation and/or correction of the carrier frequency deviation in the order of a fraction of carrier spacings in a second (CPEE) feed back processing loop by averaging the phase variation over the pilot symbols.

5. Apparatus for the frequency correction of multicarrier signals comprising:

a first (AFC) feedback control loop for correcting frequency deviations of the multicarrier signal in the order of several carrier spacings;

a second (CPEE) feedback control loop for correcting frequency deviations of the multicarrier signal in the order of a fraction of carrier spacings;

a carrier frequency error detector;

means in said first and second feedback control loops, responsive to frequency error signal from said carrier frequency error detector for performing frequency correction mutually exclusively by said first and second feedback control loops, depending on said frequency error signal exceeding or not exceeding a carrier frequency error threshold value ($\alpha f_s$).

6. Apparatus as set forth in claim 5, further comprising:
a cascade connection in the order recited of
   a multicarrier signal input terminal;
   a multiplier (M) having a first input terminal connected to said multicarrier signal input terminal and having a second input terminal;
   a Fourier Transformation unit (FFT) coupled to said multiplier, for separation of the various carriers of the multicarrier signal;
   a discreet time oscillator (DCO), having an output coupled to the second input terminal of said multiplier (M); and
means coupling the first and second feedback control loops between the Fourier Transformation unit and the discreet time oscillator, wherein frequency correction is controlled mutually exclusively by said first and second feedback control loops and said frequency threshold value substantially corresponds to the range of frequency correction of said second feedback control loop.

* * * * *